United States Patent
Boeck et al.

(10) Patent No.: US 12,011,969 B2
(45) Date of Patent: Jun. 18, 2024

(54) VEHICLE AIR CONDITIONING SYSTEM

(71) Applicant: Faiveley Transport Leipzig GmbH & Co. KG, Schkeuditz (DE)

(72) Inventors: Lutz Boeck, Schkeuditz (DE); Lorenz Kästner, Radebeul (DE)

(73) Assignee: Faiveley Transport Tours, Schkeuditz (DE)

( * ) Notice: Subject to any disclaimer, the term of this patent is extended or adjusted under 35 U.S.C. 154(b) by 0 days.

(21) Appl. No.: 17/611,744

(22) PCT Filed: Jul. 21, 2020

(86) PCT No.: PCT/DE2020/100636
§ 371 (c)(1),
(2) Date: Nov. 16, 2021

(87) PCT Pub. No.: WO2021/018346
PCT Pub. Date: Feb. 4, 2021

(65) Prior Publication Data
US 2022/0234413 A1 Jul. 28, 2022

(30) Foreign Application Priority Data
Jul. 31, 2019 (DE) .......................... 102019120719.3

(51) Int. Cl.
*B60H 1/00* (2006.01)
(52) U.S. Cl.
CPC .................................... *B60H 1/005* (2013.01)
(58) Field of Classification Search
CPC ............ B60H 1/00771; B60H 1/00371; B61D 27/0018; F24F 5/0021; Y02E 60/14
See application file for complete search history.

(56) References Cited

U.S. PATENT DOCUMENTS

| | | | |
|---|---|---|---|
| 6,260,376 B1* | 7/2001 | Khelifa | F25D 16/00 62/434 |
| 2010/0236769 A1* | 9/2010 | Lyons | B60H 1/00492 165/200 |

(Continued)

FOREIGN PATENT DOCUMENTS

| | | |
|---|---|---|
| DE | 19860057 A1 | 7/2000 |
| DE | 102009056968 B3 | 3/2011 |

(Continued)

OTHER PUBLICATIONS

Office Action for corresponding CA Application No. 3,138,975 dated Jan. 24, 2023 (4 pages).

(Continued)

*Primary Examiner* — Marc E Norman
(74) *Attorney, Agent, or Firm* — K&L Gates LLP

(57) ABSTRACT

A vehicle air-conditioning system includes at least one chiller and one cold storage unit which is designed as a PCM storage system with phase change material. The refrigeration power required for air-conditioning and for charging the PCM storage system are provided by the chiller where the cold stored in the PCM storage system is supplied to the assemblies for air-conditioning the passenger compartment in selected operating states of the vehicle. A sufficiently large amount of cold can be conducted from a phase change material of the PCM storage system into the passenger compartment such that the chiller of the air conditioning system designed for cold generation is largely put out of operation and the discharge of larger amounts of heat from the rail vehicle into the tunnel is thereby avoided.

20 Claims, 1 Drawing Sheet

(56) References Cited

U.S. PATENT DOCUMENTS

| | | | | |
|---|---|---|---|---|
| 2014/0053579 | A1* | 2/2014 | Shaikh | B60H 1/143 62/477 |
| 2015/0107295 | A1* | 4/2015 | Vreeland | F28D 20/02 62/515 |
| 2016/0341485 | A1* | 11/2016 | Blumenthal | F28D 9/0093 |
| 2018/0057023 | A1* | 3/2018 | Abou-Eid | B61D 27/0018 |
| 2018/0147916 | A1* | 5/2018 | Kolda | B60H 1/00492 |
| 2018/0283709 | A1 | 10/2018 | Al-Hallaj et al. | |
| 2022/0234413 | A1 | 7/2022 | Boeck et al. | |

FOREIGN PATENT DOCUMENTS

| | | |
|---|---|---|
| DE | 202010007146 U1 | 9/2011 |
| DE | 102019120719 B3 | 9/2020 |
| EP | 2570280 B1 | 5/2016 |
| EP | 4003808 A1 | 6/2022 |
| JP | S58152616 A | 9/1983 |
| JP | H10315750 A | 12/1998 |
| JP | 2002310464 A | 10/2002 |
| JP | 2004085176 A | 3/2004 |
| WO | 2021018346 A1 | 2/2021 |

OTHER PUBLICATIONS

First Office Action dated Nov. 28, 2022 for corresponding Chinese Patent Application No. 202080051165.5 (15 pages).

International Preliminary Report on Patentability for corresponding application No. PCT/DE2020/100636 (8 pages).

English translation of the International Preliminary Report on Patentability for corresponding application No. PCT/DE2020/100636 (8 pages).

First Examination Report dated Mar. 29, 2022 for corresponding Indian Patent Application No. 202117050426 (7 pages).

International Search Report and Written Opinion for corresponding application No. PCT/DE2020/100636 (9 pages).

English translation of the International Search Report for corresponding application No. PCT/DE2020/100636 (2 pages).

Office Action for corresponding CA Application No. 3,138,975 dated Jul. 20, 2023 (3 pages).

Examination Report No. 1 for corresponding AU Application No. 2020322927 dated Jul. 3, 2023 (3 pages).

Office Action dated Aug. 3, 2023 for corresponding Chinese Patent Application No. 202080051165.5 (13 pages).

Office Action for corresponding CN Application No. 2023112201781460 dated Nov. 22, 2023 (21 pages).

Office Action for corresponding JP Application No. 2021-565119 dated Nov. 30, 2023 (9 pages).

\* cited by examiner

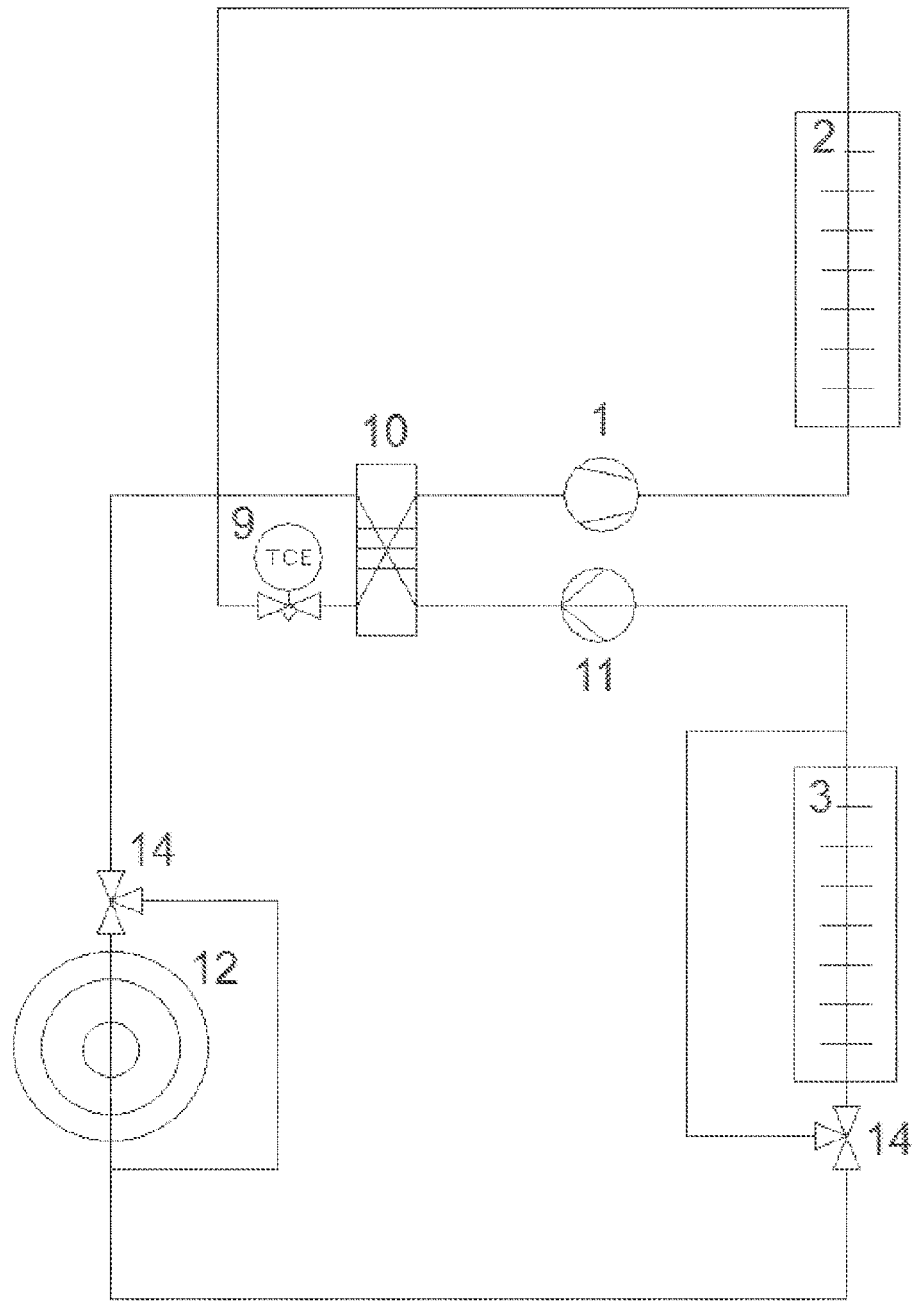

VEHICLE AIR CONDITIONING SYSTEM

CROSS-REFERENCE TO RELATED APPLICATIONS

This application is a national phase entry of International Patent Application No. PCT/DE2020/100636 (filed 21 Jul. 2020), which claims priority to German Patent Application No. 10 2019 120 719.3 (filed 31 Jul. 2019). The entire disclosures of these applications are incorporated herein by reference.

BACKGROUND

Technical Field

The invention relates to an air-conditioning system for a rail vehicle with at least one chiller and one cold storage unit which is designed as a PCM storage system with one phase change material, wherein the refrigeration power required for air-conditioning the passenger compartment and the refrigeration power required for charging the PCM storage system are provided by means of the chiller and wherein the cold stored in the PCM storage system is supplied to the assemblies for air-conditioning the passenger compartment in selected operating states of the rail vehicle. Furthermore, the invention relates to a method for operating such an air conditioning system.

State of Art

Numerous technical solutions are known for the air conditioning of passenger conveyance rail vehicles, with which heating or cooling of the passenger compartments is achieved.

For example, DE 10 2009 056 968 B3 describes an air conditioning system for rail vehicles in which the assemblies required for air conditioning are arranged on the vehicle roof. These assemblies are placed in a device trough. The device trough is covered at the top by a separate component so that it forms part of the roof shape within the contour of the rail vehicle.

This and numerous similar designs are inherently suitable for air conditioning passenger compartments in rail vehicles. However, for some specific operating conditions, further aspects must be taken into account. For example, in addition to the technical specifications for the operation of the air-conditioning system (electrical current/voltage ratios, refrigeration/heating power, air volume, etc.), the requirements for longer journeys through tunnels are becoming increasingly relevant, because the tracks for high-speed trains in long-distance travel and for local trains in areas of high population density have, in recent years, frequently been outfitted with tunnels. Due to the release to the outside of heated air from the air conditioning system, the air temperature in tunnels increases sharply and can only cool minimally between the passage of successive vehicles. For this reason, it is inherently obvious to the person skilled in the art that the chiller assemblies of the air conditioning system, which are necessary for air cooling, are switched off while the vehicle is traveling in a tunnel.

A related technical solution is proposed in WO 2005/014 365 A1. In order to however ensure functional cooling, the rail vehicle is equipped with a plurality of refrigerant storage systems, wherein frozen water, in the form of ice or other low-temperature liquids, is kept in separate containers. During travel through tunnels, the ice or alternatively liquids are used to cool the air, so that the actual chiller can be switched off and virtually no additional heated air is released into the tunnel space. A disadvantage, however, is that the refrigerant storage system must be refilled on a regular basis.

Regular refilling of refrigerant storage systems is not necessary if so-called PCM ("Phase Change Material") storage systems are used for the temporary storage of cold, these systems are also referred to as phase change storage systems or latent heat storage systems. This is functionally a heat storage system that stores an incoming thermal energy and releases it through a change in phase. PCM storage systems can store thermal energy with low losses and many repeat cycles. Preferably, solid-liquid phase transitions are used, which is to say solidification-melting. In addition to water or ice, special salts or paraffin waxes are used as storage media. PCM storage systems were initially used only for cold packs, heating pads and similar smaller objects, but they are now also being used for larger objects.

For example, DE 10 2009 058 842 A1 describes an air conditioning system for vehicles in which a phase change material can be brought into thermal contact with the passenger compartment and/or with drive components of the vehicle. This technical solution is designed for vehicles with an electric motor drive. Embodiments are described in which the passenger compartment is heated by conducting heat from a phase change material into the passenger compartment, or in which the passenger compartment is cooled by conducting heat from the passenger compartment into a phase change material, or by conducting cold from a phase change material into the passenger compartment.

For rail vehicles, a similar solution approach is known from EP 2 570 280 B1. The technical solution relates to cooling the air in the passenger compartment using a refrigeration circuit to perform cooling cycles. In the first cooling cycle, more cold is generated than is currently required to cool the passenger compartment. This excess cold is stored in a cold storage unit, which is designed as a PCM storage system. In the second cooling cycle, the stored cold is taken from the cold storage unit in specific operating states and also used to cool the air in the passenger compartment. The carrying out of a first or a second cooling cycle depends on whether the rail vehicle is in a braking phase or in a rolling phase. However, this reference does not provide any information relating to the operation of a PCM storage system depending on whether the vehicle is traveling outside or inside a tunnel.

EP 3 290 288 B1 describes an air-conditioning system for rail vehicles in which the cold required for driving through tunnels is supplied in advance to a storage system and once again taken from it during the journey in the tunnel. The system comprises a plurality of refrigeration units distributed in the vehicle, a chiller which supplies these refrigeration units with cold, and a storage unit which can also be charged with cold by the chiller. When outside a tunnel or a similar partially enclosed section of the track, the chiller supplies the refrigeration units of the air conditioning system with cold. If there is a surplus of refrigeration power, this surplus is charged into the storage unit. During longer tunnel passages, the stored cold is taken from the storage unit and fed to the assemblies for cooling the passenger compartment. During this process, the chiller is switched off and does not give off any additional heat in the tunnel space. A disadvantage, however, is that the cold storage unit is only charged if there is a surplus of cold. Thus, the amount of cold available from the cold storage unit is often insufficient for longer tunnel passages or for successive short travel sections through several tunnels. As a consequence, the chiller cannot be switched off or can only be switched off temporarily, such that, in sections, strongly heated air continues to be discharged into the tunnel.

DE 198 60 057 A1 describes a vehicle air conditioning system comprising a primary refrigerant refrigeration circuit, a secondary water-glycol circuit and a plate heat exchanger connecting these one after the other. In the secondary circuit, a cold storage system and a heat exchanger are arranged one after the other. This allows air conditioning when the primary circuit is not in operation.

BRIEF SUMMARY

The task of the invention is to provide an air conditioning system for rail vehicles with a cold storage unit designed as a PCM storage system, wherein a sufficiently large amount of cold can be conducted from a phase change material of the PCM storage system into the passenger compartment such that, during longer tunnel passages, the chiller of the air conditioning system designed for cold generation is largely switched off and the discharge of larger amounts of heat from the rail vehicle into the tunnel is thereby avoided.

This task is solved by dividing the refrigeration circuit into a primary circuit with a refrigerant and a secondary circuit with a water-glycol mixture, with the primary circuit providing the refrigeration power for air conditioning the passenger compartment and for charging the PCM storage system, and wherein the refrigeration power is transferred to the secondary circuit via a plate heat exchanger.

The PCM storage system and a water heat exchanger for cooling the air in the passenger compartment are arranged one behind the other in the direction of flow in the secondary circuit. In this manner, a lower temperature level can be achieved for the cold storage unit. The resulting slightly higher temperature level of the refrigerant on leaving the cold storage unit is still sufficient for the heat exchanger to the passenger compartment. The cold storage unit is thereby at a lower temperature level than the heat exchanger to the passenger compartment. When operating from the cold storage unit, there is no significant change in temperature level compared to operation with the chiller running.

The phase change material is designed in the form of small plate-shaped segments, arranged in a container of the PCM storage system and the water-glycol mixture of the secondary circuit flows around the phase change material in this container.

One bypass line is arranged at the PCM storage system and one at the water heat exchanger in the secondary circuit, which bypass lines are opened or shut off by a three-way valve as a function of the current operating mode of the air-conditioning system.

In terms of process technology, this air-conditioning system is operated in such a way that during operation of a rail vehicle while traveling outside a tunnel, the chiller primarily charges the cold storage unit with cold and that when the chiller is not in operation, the cold energy stored in the PCM storage system is fed to the water heat exchanger. Various alternatives are possible:

For example, during operation while the rail vehicle is traveling outside a tunnel, the chiller can initially only charge the cold storage unit with cold and provide cold for cooling the passenger compartment only after the cold storage unit has been fully charged.

Preferably, however, the air conditioning system is used in parallel operation, such that the chiller charges the cold storage unit with cold while in operation during travel outside a tunnel and at the same time also provides cold for cooling the passenger compartment. In this variant, it is preferable that the percentage ratio of the charging or provision of cold for the cold storage unit and for the passenger compartment is adjustable. In this, route topography, interior and exterior temperatures, number of passengers, frequency and duration of door openings at stations and similar parameters can, for example, be taken into account as the basis of a regulation or control.

Regardless of the specific variant selected, the cooling of the passenger compartment can be further optimized as soon as the cold storage unit is charged. Changing priorities in the allocation of the available refrigeration power between the passenger compartment and the cold storage unit are possible, of which three possible alternatives are named below:

(a) Renunciation of charging of the cold storage unit when there is a very high demand for refrigeration power in the passenger compartment, for example, typical of rush-hour commuter traffic.

b) Charging of the cold storage unit exclusively when the demand for refrigeration power is low, making use of the upper temperature limit for the passenger compartment c) Targeted proactive lowering of the passenger compartment temperature within the permissible temperature control range and thereby use of the passenger compartment as storage system.

The technical solution according to the invention results in several advantages over the conventional designs used to date. For example, a cold energy storage system has to store less energy than a warm energy storage system, since the compressor energy does not have to be stored. A better coefficient of performance (COP) is achieved in the ratio of refrigeration power generated to the energy used for this purpose in storage mode. A further advantage consists in that by combination with a secondary refrigeration circuit, the amount of refrigerant used is reduced. Likewise, fewer assemblies are required because the same heat exchanger is used to cool the supply air in hybrid mode and in conventional cooling mode. There is no need to modify the supply air flow by adding another heat exchanger.

The technical solution according to the invention is preferentially suitable for high-speed trains in long-distance traffic and for local trains in urban centers where the track has longer tunnel sections or similar enclosed track sections. Furthermore, operating times without power supply can be bridged, for example, for pre-cooling of parked rail vehicles before the start of operation at high outside temperatures or for emergency cooling in the event of sudden failures. Independent of the specific application, a large enough quantity of cold is fed from the phase change material of a PCM storage system into the passenger compartment that sufficient cooling of the passenger compartment is ensured even when the chiller of the air conditioning system designed for cold generation is not in operation, without discharging large amounts of heat from the rail vehicle.

DESCRIPTION OF THE DRAWINGS

In the following, an embodiment example of the invention is explained in more detail. Herein, FIG. 1 shows the basic structure of an air-conditioning system for a rail vehicle designed according to the invention with a PCM storage system as the cold storage unit.

DETAILED DESCRIPTION

The air conditioning system shown in stylized form in FIG. 1 is designed for a rail vehicle and comprises a chiller 1 and a cold storage unit 12. The cold storage unit 12 is designed as a PCM storage system with phase change material. The chiller 1 includes and is associated with a compressor that provides the refrigeration power required for air conditioning the passenger compartment (not shown) and the refrigeration power required for charging the PCM storage system 12. The cold stored in the PCM storage system 12 is supplied to the assemblies for air conditioning the passenger compartment in selected operating states of the rail vehicle-preferentially during travel in a tunnel.

It can be seen from the drawing that the cooling circuit is divided into a primary circuit (TOP) with a refrigerant and a secondary circuit (BELOW) with a water-glycol mixture. All available refrigerants are suitable as refrigerants for the primary circuit, which is to say both synthetic (for example, R134a) and natural (for example, $CO_2$ or propane) refrigerants.

The primary circuit with the chiller 1, a condenser 2 and an expansion valve 9 provides the refrigeration power for air conditioning the passenger compartment and for charging the PCM storage system 12.

For this purpose, the refrigeration power is transferred from the primary circuit to the secondary circuit via a plate heat exchanger 10. In this secondary circuit, the PCM storage system 12 and a water heat exchanger 3 for cooling the air in the passenger compartment are arranged one after the other in the direction of flow from the plate heat exchanger 10. A water pump 11 is arranged downstream of the water heat exchanger 3, in the flow path, which in turn is in operative connection with the plate heat exchanger 10.

The phase change material, which is not shown in more detail, is in the form of small plate-shaped segments and is arranged in a container of the PCM storage system 12, which is also not shown in more detail. The water-glycol mixture of the secondary circuit flows around the phase change material in this container. The phase change material can largely be any material available on the market for this purpose, preferably paraffin waxes with a melting point of between 0° C. and 15° C. or water.

Furthermore, the PCM storage system 12 and the water heat exchanger 3 in the secondary circuit are each operatively connected to a separate three-way valve 14. The two three-way valves 14 can be switched in such a way that the PCM storage system 12 and the water heat exchanger 3 can be bypassed using an associated bypass line, this dependent on the current operating mode of the air-conditioning system.

An air-conditioning system set up in this way is operated in such a way that, during operation of a rail vehicle while traveling outside a tunnel, the chiller 1 primarily charges the cold storage unit/PCM storage system 12 with cold. At the same time, the cold storage unit 12 can thereby be charged with cold and cold can be provided for cooling the passenger compartment. In this operating state, the percentage ratio of the charging or provision of cold for the cold storage unit 12 and for the passenger compartment can be set. Alternatively, it is also possible that initially only the cold storage unit 12 is charged with cold and cold is provided for cooling the passenger compartment only once the cold storage unit 12 has been fully charged. If the compressor of the chiller 1 is not being operated, which is to say, preferentially while driving in a tunnel, the cold energy stored in the PCM storage system 12 is fed to the water heat exchanger 3.

The invention claimed is:

1. A vehicle air-conditioning system comprising:
   at least one chiller;
   a phase change material (PCM) storage system having at least one cold storage unit with a phase change material, wherein the at least one chiller is configured to provide first refrigeration power for charging the PCM storage system and to provide second refrigeration power for air-conditioning a vehicle passenger compartment, the PCM storage system configured to supply cold energy to one or more vehicle assemblies configured to air-condition the vehicle passenger compartment in selected operating states of a vehicle;
   a primary circuit with a refrigerant, the at least one chiller arranged in the primary circuit;
   a secondary circuit with a water-glycol mixture and a water heat exchanger, the the vehicle air-conditioning system including a plate heat exchanger between the primary circuit and the secondary circuit, the PCM storage system and the water heat exchanger arranged in ef the secondary circuit one after another in a direction of flow in the secondary circuit, the phase change material arranged in a form of plate-shaped segments in a container of the PCM storage system, the secondary circuit configured to direct flow of the water-glycol mixture around the phase change material in the container; and
   a first bypass line arranged at the PCM storage system and a second bypass line arranged at the water heat exchanger in the secondary circuit, one or more of the first bypass line or the second bypass line configured to be opened or shut off by a corresponding three-way valve as a function of different operating modes of the vehicle air-conditioning system,
   wherein the vehicle air-conditioning system operating in a first operating mode of the different operating modes is configured to provide the first refrigeration power for charging the PCM storage system, and the vehicle air-conditioning system operating in a second operating mode of the different operating modes is configured to provide the second refrigeration power for air-conditioning the vehicle passenger compartment,
   wherein the vehicle air-conditioning system is configured to change operating modes based on a state of charge of the PCM storage system reaching a determined threshold and a location of the vehicle,
   wherein changing the operating mode of the vehicle air-conditioning system includes changing a setting of one or more of the three-way valve of the first bypass line or the three-way valve of the second bypass line.

2. A method for operating the vehicle air-conditioning system according to claim 1, comprising:
   charging the PCM storage system with the cold energy during operation of the vehicle while traveling outside a tunnel until the state of charge of the PCM storage system reaches the determined threshold; and
   feeding the cold energy stored in the PCM storage system to the water heat exchanger while the at least one chiller is not in operation during operation of the vehicle while traveling inside the tunnel.

3. The method of claim 2, wherein charging the PCM storage system with the cold energy by the at least one chiller providing the first refrigeration power to the PCM storage system also includes providing the cold energy for cooling the passenger compartment during operation of the vehicle while traveling outside of the tunnel.

4. The method of claim 3, further comprising:
adjusting a percentage ratio of charging or provision of the cold energy for the PCM storage system and for the passenger compartment based on the state of charge of the PCM storage system.

5. The method of claim 2, wherein charging the PCM storage system includes feeding the cold energy stored in the PCM storage system to the water heat exchanger after the PCM storage system has been fully charged.

6. The method of claim 2, wherein feeding the cold energy stored in the PCM storage system to the water heat exchanger while the at least one chiller is not in operation includes providing the cold energy to the passenger compartment to control a temperature of the passenger compartment of the vehicle.

7. The method of claim 6, further comprising providing the cold energy to the passenger compartment from the PCM storage system during operation of the vehicle within the tunnel.

8. The vehicle air-conditioning system of claim 1, wherein the vehicle air-conditioning system is configured to change from the first operating mode to the second operating mode responsive to the PCM storage system reaching a fully charged state.

9. The vehicle air-conditioning system of claim 1, wherein the first bypass line is configured to control operation of the three-way valve while the vehicle air-conditioning system operates in the first operating mode of the different operating modes to direct a first amount of the cold energy toward the PCM storage system, and
wherein the first bypass line is configured to control operation of the three-way valve while the vehicle air-conditioning system operates in the second operating mode of the different operating modes to direct a different, second amount of the cold energy toward the PCM storage system.

10. The vehicle air-conditioning system of claim 9, wherein a remaining amount of the cold energy is configured to be directed toward the passenger compartment of the vehicle.

11. The vehicle air-conditioning system of claim 1, wherein the second bypass line is configured to control operation of the three-way valve to direct at least some of the cold energy stored in the PCM storage system to the water heat exchanger after the PCM storage system has been fully charged.

12. The vehicle air-conditioning system of claim 1, wherein the second bypass line is configured to control operation of the three-way valve to direct at least some of the cold energy stored in the PCM storage system to the water heat exchanger based on the location of the vehicle.

13. The vehicle air-conditioning system of claim 1, wherein the chiller is configured to provide at least some first refrigeration power for charging the PCM storage system and provide at least some second refrigeration power for air-conditioning the vehicle passenger compartment while the vehicle is moving outside of a tunnel.

14. The vehicle air-conditioning system of claim 1, wherein the second bypass line is configured to control operation of the three-way valve to direct at least some of the cold energy stored in the PCM storage system to the water heat exchanger while the vehicle is moving within a tunnel.

15. The method of claim 14, further comprising adjusting a percentage ratio of charging or provision of the cold energy for the PCM storage system and for the passenger compartment based on one or more characteristics of the passenger compartment.

16. The method of claim 15, wherein the one or more characteristics of the passenger compartment include one or more of a number of passengers within the passenger compartment or a temperature of the passenger compartment.

17. The method of claim 14, further comprising providing at least some of the cold energy from the at least chiller for the passenger compartment during operation of the vehicle while traveling outside the tunnel.

18. The method of claim 14, further comprising controlling a first amount of at least some of the cold energy for charging the PCM storage system and controlling a second amount of at least some of the cold energy for controlling a temperature of the passenger compartment during operation of the vehicle while traveling outside the tunnel.

19. The vehicle air-conditioning system of claim 1, wherein the chiller is configured to operate based in a on the location of the vehicle.

20. The vehicle air-conditioning system of claim 19, wherein the chiller is configured to be turned off while the vehicle is moving within a tunnel.

* * * * *